(12) United States Patent
Bodenstein et al.

(10) Patent No.: US 7,679,019 B2
(45) Date of Patent: Mar. 16, 2010

(54) ELECTRICAL SWITCHING SYSTEM

(75) Inventors: Klaus Bodenstein, Voerde (DE); Detlef Lange, Oberhausen (DE)

(73) Assignee: Switchcraft Europe GmbH, Dinslaken (DE)

( * ) Notice: Subject to any disclaimer, the term of this patent is extended or adjusted under 35 U.S.C. 154(b) by 292 days.

(21) Appl. No.: 11/716,357

(22) Filed: Mar. 9, 2007

(65) Prior Publication Data

US 2007/0267388 A1    Nov. 22, 2007

(30) Foreign Application Priority Data

Mar. 9, 2006   (DE) .................. 10 2006 010 893
Jan. 26, 2007  (DE) .................. 10 2007 004 950

(51) Int. Cl.
H01H 9/40 (2006.01)

(52) U.S. Cl. .............................. 218/2; 218/7

(58) Field of Classification Search ............. 218/2–4, 218/7, 10–14, 44, 45, 55, 68–70, 75, 78–80, 218/152–154
See application file for complete search history.

(56) References Cited

U.S. PATENT DOCUMENTS

| | | | |
|---|---|---|---|
| 4,484,044 A | 11/1984 | Yoshigae | |
| 5,644,117 A | 7/1997 | Bolongeat-Mobleu et al. | |
| 6,144,005 A * | 11/2000 | Tanimizu et al. | 218/118 |
| 6,268,579 B1 * | 7/2001 | Kajiwara et al. | 218/153 |

FOREIGN PATENT DOCUMENTS

| | | |
|---|---|---|
| CH | 559977 A5 | 3/1975 |
| DE | 102 19 299 B3 | 2/2004 |
| DE | 60 003 327 T2 | 5/2004 |
| EP | 0070794 A2 | 1/1983 |
| EP | 0 680 063 B1 | 11/1995 |
| EP | 1 218 995 B1 | 7/2002 |
| FR | 2719154 A1 | 10/1995 |
| WO | WO 01/26198 A1 | 4/2001 |

* cited by examiner

*Primary Examiner*—Renee S Luebke
*Assistant Examiner*—Marina Fishman
(74) *Attorney, Agent, or Firm*—Collard & Roe, P.C.

(57) ABSTRACT

An electrical switching system, preferably a medium-voltage switching system, has a power switch or load switch, a disconnecting switch, and a grounding switch configured as a vacuum switching chamber. Low separation distance lengths and a more compact construction of a switching system is achieved by means of a housing in which the disconnecting switch, configured as a vacuum switching chamber, the grounding switch, and the power switch or load switch are disposed, and in which a central switch is disposed, with which the vacuum switching chambers of disconnecting switch and grounding switch can be mechanically activated. Electrical connections between connector contacts of power switch or load switch, disconnecting switch, and grounding switch can be produced.

14 Claims, 2 Drawing Sheets

ELECTRICAL SWITCHING SYSTEM

BACKGROUND OF THE INVENTION

1. Field of the Invention

The invention is directed at a switching system, preferably a medium-voltage switching system, comprising a power switch or load switch, a disconnecting switch, as well as a grounding switch configured as a vacuum switching chamber.

2. The Prior Art

Electrical switching systems, frequently also configured in gas-insulated form, are particularly used in the sector of medium-voltage technology, and usually possess a disconnecting switch and a grounding switch. The disconnecting circuit and the grounding circuit can be implemented in one switch, as well as a power switch. The disconnecting and grounding switches, which can be brought into electrical connection with one another, as well as the power switch, then connect a bus bar with an outgoing circuit that is connected with several cable connectors, for example. The two switches, namely the disconnecting and grounding switch as well as the power switch, are disposed one after the other, in a common grounded housing, branching off from the encapsulation of the bus bar.

In this connection, the switches are generally disposed on top of one another or next to one another, and are moved in the common direction of movement, in a translational manner. Such a gas-insulated electrical switching system is described in Swiss Patent No. CH 559977 A5. Because the disconnecting and grounding switch and the power switch are arranged vertically on top of one another, a necessary construction height exists, which results from the dimension of the individual switches as well as the dimension of the required disconnecting distance, i.e. the length of the separation distances. Since the two switches are disposed vertically on top of one another, the lengths of the individual components and separation distances add up to produce the required construction height.

In this connection, it is true that it is already possible to configure the power switch as a vacuum switch and thereby to reduce the required separation distance, which is clearly smaller in a vacuum than in a gas atmosphere. Thus, a switching system of the type stated is known from German Patent No. DE 102 19 299 B3, in which the power switch and the disconnecting switch are configured as a structural unit. However, the disconnecting switch is located further in the inert gas atmosphere, so that a separation distance path corresponding to the surrounding gas atmosphere is required to form a reliable separation distance. Furthermore, in the case of the switching system known from this document, a grounding switch configured as a vacuum switch is provided, which is disposed perpendicular to the power and/or power disconnecting switch. For grounding, which takes place after the power disconnecting switch has been brought into its disconnecting position, the moving contact of the vacuum switch is moved towards its fixed contact from the outside. In the case of this embodiment, as well, there is a relatively great construction height, since the disconnecting part of the power disconnecting switch is configured in the gas atmosphere, and there, a separation distance that assures disconnection of the electrical conduction connection must be configured.

European Patent No. EP 1 218 995 B1 describes a gas-insulated electrical switching system, which has an interruption unit having a fixed contact and a movable contact, as well as a disconnecting and grounding switch configured as a rotary switch, which is disposed on the side of the fixed contact of the interruption unit. Different disconnecting and grounding positions can be set by means of the rotary switch. With this system, however, both the disconnecting and grounding switch and the interruption unit with its fixed contact and its movable contact are, once again, disposed in an insulating gas atmosphere. Here again, the separation distances required under the conditions of the insulating gas must therefore be adhered to.

EP 0 680 063 B1 describes configuring a power or load switch in the form of a rotary switch having a pole bridge that can be rotated, whereby at the same time, a tappet connected with a movable contact of a vacuum switch is activated by means of a control cam configured on a movable contact of the pole bridge.

With known switching systems, at least the separation distance of the disconnecting and grounding switch, but also, if applicable, the separation distance of the power switch, in addition, are situated in a gas atmosphere of insulating gas. This makes it necessary to configure relatively long distances between the contacts that form the separation distance, in each instance, to assure a sufficient separation distance, in order to avoid flash-over or leakage paths. This has the result that such gas-insulated switching systems are configured to be very voluminous and as a correspondingly large structural unit.

SUMMARY OF THE INVENTION

It is therefore an object of the invention to create a solution that makes it possible to configure low separation distance lengths and to achieve a more compact construction of a switching system, as compared with the state of the art.

In the case of a switching system of the type indicated initially, this task is accomplished, according to the invention, by means of a housing on which the disconnecting switch, configured as a vacuum switching chamber, the grounding switch, and the power switch or load switch are disposed, and in which a central switch is disposed, with which the vacuum switching chambers of disconnecting switch and grounding switch can be mechanically activated, and electrical connections between connector contacts of power switch or load switch, disconnecting switch, and grounding switch can be produced.

By means of the invention, a switching system is therefore obtained in which the separation distances of disconnecting switch and grounding switch are minimized in that these are configured as vacuum switches and have a vacuum switching chamber, in each instance. It is known that the lengths of separation distances required to avoid flash-over or leakage paths in a vacuum are clearly lower than in a gas atmosphere, such as an atmosphere of electrically insulating gas, for example. Since the separation distances are clearly less, the corresponding required switching paths for keeping the contacts at a sufficient distance from one another, spacing them apart to form the separation distance, in each instance, are now reduced into the range of 2-3 mm in the case of medium-voltage systems. Furthermore, because the disconnecting switch, grounding switch, and power switch or load switch are disposed in one housing, in which a central switch is disposed, which both switches the electrical connections and also activates the vacuum switching chambers of disconnecting switch and grounding switch, further compression of the structure towards a compact construction size is guaranteed. Furthermore, the power switch or load switch can also be provided with a vacuum chamber or vacuum switching chamber, thereby also reducing its construction length, i.e. construction size as compared with a disconnection unit disposed in an insulating gas atmosphere.

Since the vacuum switching chambers and the power switch or load switch are directly flanged onto the housing of the central switch, a significant reduction in the required separation distance lengths results from this combination, and thus the configuration of a compact switching system is achieved.

In an advantageous embodiment of the invention, the central switch is locked together with the drive of the power switch or load switch, particularly mechanically, in such a manner that it can be moved or activated only when the power switch or load switch is open. In this connection, the central switch is furthermore designed so that it is possible to mechanically activate contact tappets of the vacuum switching chambers with the central switch, and, at the same time, to produce an electrical connection with each connector contact.

In particular, it is advantageous if the central switch is configured as a rotary switch, something that the invention also provides. This embodiment, in particular, makes it possible to implement a switching system whose central switch allows five switching positions, and, in this manner, produces the electrical connections that are desired, between each of the connector contacts of the power switch or load switch, the vacuum switching chamber of the disconnecting switch to the bus bar, and the vacuum switching chamber to the ground, or disconnects these electrical connections.

The switching and switch positions comprise a normal position in which the disconnecting switch and power switch or load switch having the connector contacts A and B are connected with one another. In this normal position, the power switch or load switch and the disconnecting switch are therefore brought into an electrically conductive connection with the bus bar, by means of the central switch.

The five switching positions furthermore comprise a second position in which the disconnecting switch and grounding switch having the connector contacts B and C are connected with one another, and the disconnecting switch as well as the bus bar are grounded. In this second switch position, the central switch therefore connects the vacuum switching chamber of the disconnecting switch with the bus bar and with the vacuum switching chamber of the ground, and the subsequent connection to ground.

A third position of the central switch consists in the situation that the power switch or load switch, disconnecting switch and grounding switch having the connector contacts A, B, and C are connected with one another, and the power switch or load switch and the disconnecting switch as well as the bus bar are grounded. In this third switch position, the power switch or load switch and the vacuum switching chamber of the disconnecting switch, with a connection to the bus bar, are therefore connected with the vacuum chamber of the ground, with the electrical connecting line to ground, by way of the central switch.

In a fourth position, the power switch or load switch and grounding switch having the connector contacts A and C are connected with one another, and the power switch or load switch is grounded. In this fourth switch position, the power switch or load switch is therefore connected with the vacuum switching chamber of the ground and the subsequent connection to ground, by way of the central switch.

Finally, there is a neutral position in which there is no connection between the power switch or load switch, disconnecting switch and grounding switch having the connector contacts A, B, and C, and both the grounding switch and the disconnecting switch are open. In this fifth position, the neutral position, no electrical connections are therefore produced between the two vacuum switching chambers of the disconnecting switch and of the grounding switch, as well as of the power switch or load switch. Furthermore, the disconnecting switch and the grounding switch in the vacuum switching chambers are open, with an electrical connection to ground and to the bus bar.

The central switch is mechanically locked in such a manner that it can only be switched if the power switch or load switch is open. If an electrical connection to the vacuum switching chambers for the ground or to the bus bar is produced, so that a contact of the central switch enters into connection with the contact tappet of a vacuum switch, not only is an electrical connection in the electrical line connection closed in this way, but also the contact tappet is mechanically activated and the switch in the vacuum switching chamber is closed, so that an electrically conductive connection is produced.

For simplification and standardization of the switching elements, the invention furthermore provides that the vacuum switching chambers of grounding switch and disconnecting switch are configured with the same construction.

In a particularly advantageous embodiment, the vacuum switching chambers do not have any independent shut-off capacity, and comprise means for maintaining their separation distance. For this purpose, a pressure spring that acts on the movable switching contact is provided outside of the actual switching chamber, in which the switching contacts are moved towards and away from one another, which spring forces the contact tappet having the switching contact into its open position. To close the contact, the switching contact tappet must be moved counter to the force of this pressure spring, into the closed position of the vacuum switch. The invention therefore furthermore provides that the vacuum switching chambers has a contact tappet guided in a folded bellows cuff, whereby the contact tappet is stabilized in the open state of the vacuum switching chamber by a pressure spring disposed outside of the vacuum switching chamber and acting on the tappet, or held in its open position. The vacuum switching chambers therefore do not possess any independent shut-off capacity, but rather can only secure the separation distance, in each instance, or produce the contact, depending on whether they are activated by the central switch or not. The switching contacts can be configured as a ring contact or a surface contact, something that the invention also provides.

In order to not have to structure the central switch in a particularly complicated manner of construction, and, in particular, in order to be able to configure a switching system insulated with solid material, it is practical to produce the housing that surrounds the central switch from an insulating material, particularly a cast resin, in order to secure the insulating properties of the housing, something that the invention also provides. However, it is also possible to embed the housing into such an insulating material, particularly to sheathe it with cast resin or insulating material.

Because of the compact construction, the housing with the central switch and the power switch or load switch, disconnecting switch and grounding switch connected with it form a compact switching unit. This switching unit, in turn, can nevertheless be disposed in a housing filled with insulating gas, something that also characterizes the invention. In this connection, the insulating gas then primarily serves not to produce a sufficient dielectric strength, but rather to protect the materials against aging.

Finally, in one embodiment, the invention provides that the switching system is an integral part of a switching station or a switching cell.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
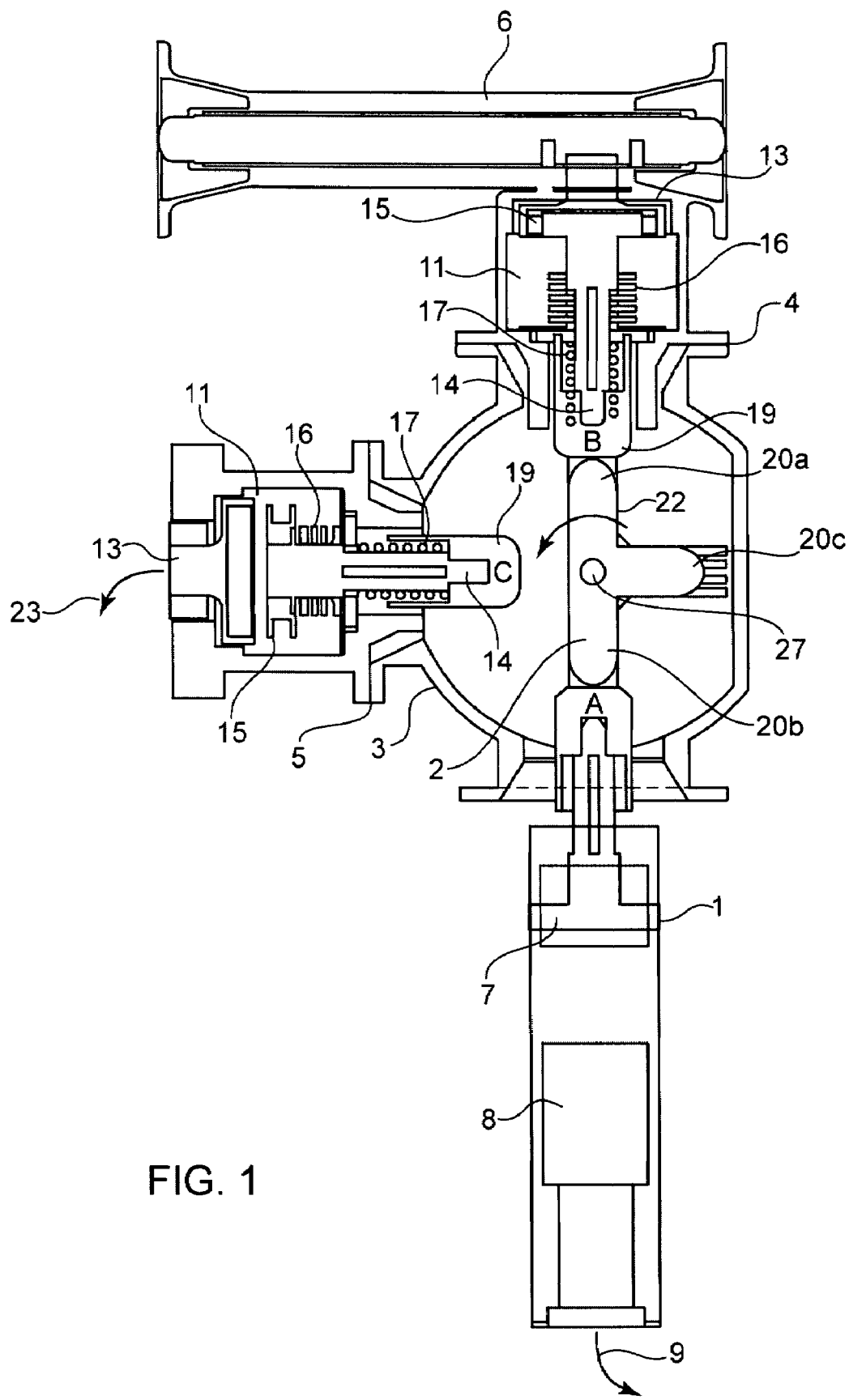
FIG. 1 shows a schematic sectional representation of the components of a switching system according to the invention.

Referring now in detail to the drawings, FIG. 1 shows a power switch 1, a central switch 2 having a housing 3 that surrounds and encloses this switch, a disconnecting switch 4, a grounding switch 5, and a bus bar 6. All of these elements are components of a switching system, whereby the housing 3 with the central switch 2, the power switch 1, the disconnecting switch 4, and the grounding switch 5 form a switching unit. This switching unit can be disposed in a housing, not shown, which can be filled with an insulating gas that displaces air, $N_2$ or extinguishing gas, particularly $SF_6$ (sulfur hexafluoride). The switching system can therefore be a gas-insulated switching system, particularly for the medium-voltage range, whereby the switching system can furthermore also be an integral part of a switching station or a switching cell. In the present case, however, the switching system is configured as a switching system insulated with solid material, and particularly designed for the medium-voltage range.

In FIG. 1, the central switch 2, which is configured to be electrically conductive, is in its normal position. In this normal position, it connects the connector contacts A of the power switch 1 and B of the disconnecting switch 4 with one another, so that an electrical connection line from the bus bar 6 through the disconnecting switch 4, the central switch 2 to the power switch 1 is switched through. The connector contact A stands in a conductive connection with a fixed contact 7 of the power switch 1. The power switch 1 is in its "open" position, so that its movable contact 8 is disposed at a distance from the fixed contact 7, forming a separation distance to the latter. By way of the movable contact 8, the power switch 1 is connected with an electrical outgoing circuit, symbolized by the arrow 9, for example in the form of cable connectors. In the closed position of the power switch 1, an electrical connection from the bus bar 6 to the outgoing circuit 9 would therefore be switched through in this normal position of the central switch 2.

Figure 2:
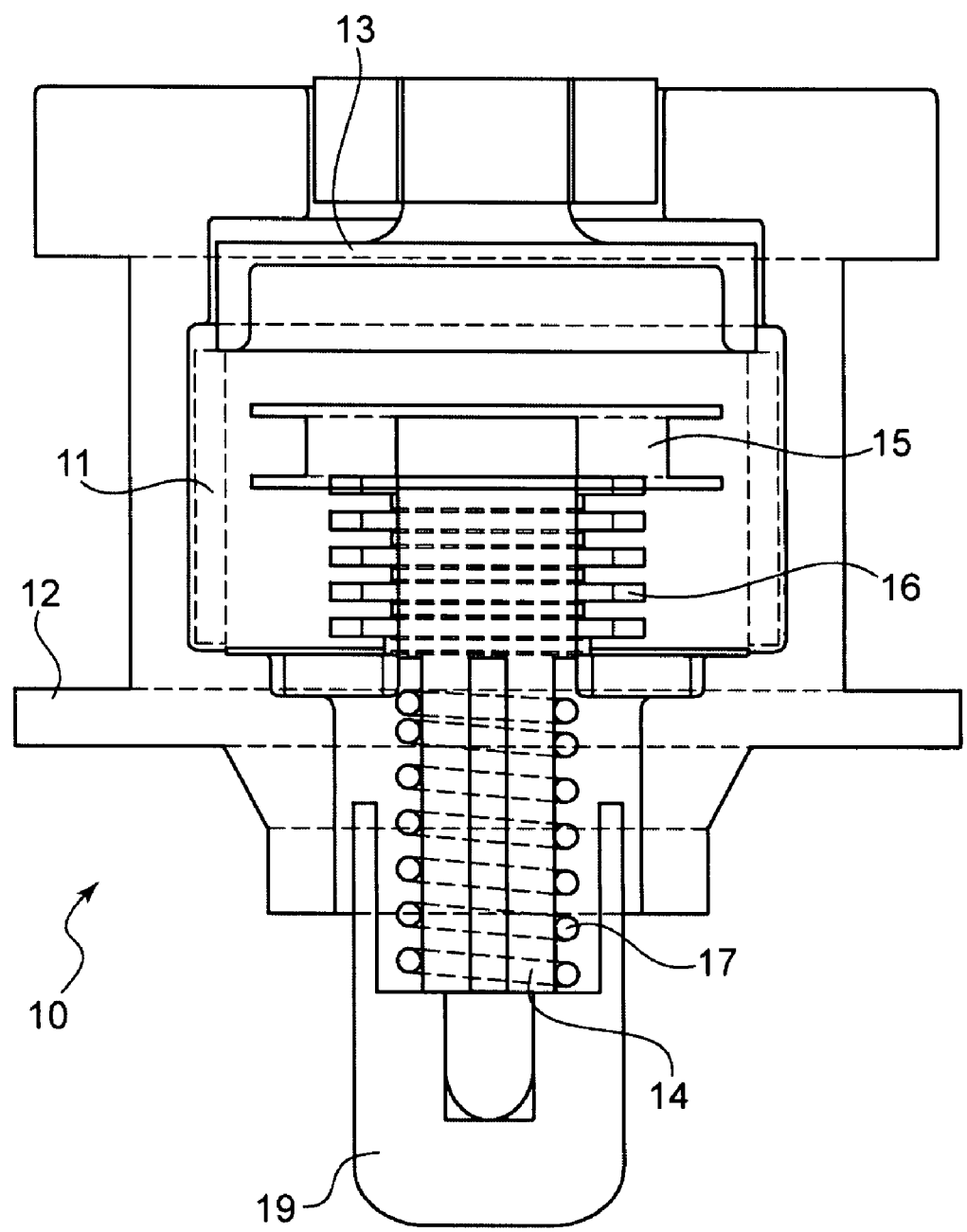
FIG. 2 shows a schematic sectional representation of a vacuum switching chamber.

Both the disconnecting switch 4 and the grounding switch 5 are provided with a vacuum switching chamber 10, in each instance. The disconnecting switch 4 and the grounding switch 5 are furthermore configured with the same construction. Such a vacuum switching chamber 10 is shown in a schematic sectional representation in FIG. 2. The vacuum switching chamber 10 comprises a vacuum chamber 11, which is configured in the housing 12 of the vacuum switching chamber 10. A fixed contact 13 is disposed in the vacuum chamber 11, which contact forms an electrical connection from the vacuum chamber 11 out towards the outside. A contact tappet 14 projects into the vacuum chamber 11 through an opening disposed on the opposite side of the vacuum chamber 11, which tappet is provided with a switching contact 15 on the vacuum chamber side. In the chamber 11, the contact tappet 14 is disposed so that it can be displaced in a folded bellows cuff 16 made of metal, counter to the force of a pressure spring 17 disposed outside of the vacuum chamber 11, longitudinally-axially, whereby the folded bellows cuff 16 provides the required seal. The contact tappet 14 with the switching contact 15 therefore forms a movable switching contact that can be brought into contact with the fixed contact 13 configured as an additional switching contact, counter to the force of the pressure spring 17. On the outside, a connector contact 19 is configured and disposed on a pin-shaped head end 18 of the contact tappet 14, in the form of a cap. The connector contact 19 lies on a step on the contact tappet 14, and has a radial ring space for accommodating the pressure spring 17. When a force is exerted on the connector contact 19 in the direction towards the fixed contact 13, the contact tappet 14 can therefore be moved towards the fixed contact 13, counter to the force of the pressure spring 17, by way of the connector contact 19, so that the switching contacts 15 and 13 enter into contact with one another and form a line connection. The connector contact 19 forms the connector contact B for the disconnecting switch 4 and the connector contact C for the grounding switch 5. For the remainder, the grounding switch 5 and the disconnecting switch 4 are configured with the same construction.

In the normal position of the central switch 2 shown in FIG. 1, said switch is in contact with the connector contact B with its contact 20a, but at the same time, also mechanically moves the contact tappet 14 of the disconnecting switch 4 into its switching position shown, by way of the connector contact B, in which position the switching contacts 13 and 15 of the disconnecting switch 4 stand in contact with one another and therefore an electrical line connection is switched through.

The rotary switch 2 is configured in T shape and has contacts 20a, 20b, and 20c at the ends of its shanks. The rotary switch 2 is electrically conductive and disposed in the housing 3 so as to rotate about a central axle 21, so that it forms a rotary switch. From the normal position shown in FIG. 1, the rotary switch 2 can be moved, in the direction of the arrow 22, into a second switching position, in which the contact 20a then enters into a conductive and active connection with the connector C, as does the contact 20c with the connector contact B. Since the switches 1, 4, and 5 are disposed symmetrically on the circumference of the housing 3, and the connector contacts A and B are disposed 90° away from the connector contact C, in each instance, on the partial piece of the side wall of the housing 3 that is approximately arc-shaped in this region, the contact 20a can be moved away from the connector contact B towards the connector contact C by means of rotating the switch by 90° in the direction of the arrow 22, by means of the fact that the contacts 20a, 20b, 20c are also offset from one another by correspondingly 90°, because of the T-shaped configuration of the central switch 2. In this connection, at the same time, the contact 20c is moved towards the connector contact B. As soon as the contact 20a moves away from the connector contact B, the latter, together with the contact tappet 14 that rests against it, is moved in the direction towards the center of the housing 3 by the force of the pressure spring, so that the switches 13 and 15 open and a separation distance is formed. If the central switch 2 is rotated further, the contact 20a comes into contact with the connector contact C, and, at the same time, the contact 20c comes into contact with the connector contact B, whereby in case of further rotation, the contacts 20a and 20c move the connector contacts C and B, and with them, the contact tappets 14, in each instance, counter to the force of the pressure spring 17, in each instance, and thereby move both the disconnecting switch 4 and the grounding switch 5 into a switching position in which the switching contacts 13 and 15 are in contact with one another, in each instance. By way of the electrically conductive central switch 2, the disconnecting switch 4 and the bus bar 6 connected with it, as well as the grounding switch 5 then stand in connection with the ground indicated as the arrow 23, so that the bus bar is grounded. If the central switch 2 is rotated further in the direction of the arrow 22, the contacts 20a and 20c come loose from the connector contacts B and C, so that the disconnecting switch 4 and the grounding switch 5 move back into an open position, with separated switching contacts 13, 15, until then the contact 20b enters into connection with the connector contact B, the contact 20c with the connector contact C, and the contact 20a with the connector contact A, and after completion of this further rotation all the way into a 90° position, a third switching position is then reached by the central switch 2, in which the switches 4 and 5 are closed again, so that all of the connector contacts A, B, and C are connected with one another, and the power switch 1, the disconnecting switch 4, as well as the bus bar 6 are grounded. If the central switch 2 is subsequently rotated again by 90°, a fourth switching position of the central switch 2 is reached, in analogous manner, and a connection between the power switch 1 and the grounding switch 5 is produced by way of the central switch 2, so that the power switch 1 is grounded, whereby then, the contact 20c and the connector contact A as well as the contact 20b and the connector contact C are in connection with one another, in each instance.

In all of the intermediate positions of the central switch 2, in which the contacts 20a, 20b, and 20c do not stand in or enter into connection with any of the connector contacts A, B, or C, a fifth position, the neutral position of the central switch 2, exists. Then, there is no connection between the power switch 1 and/or the disconnecting switch 4 and/or the grounding switch 5. Furthermore, the vacuum switching chambers 10 of disconnecting switch 4 and grounding switch 5 are open and form a separation distance between the switching contacts 13 and 15, in each instance.

In total, the structural shape of the central switch 2 as well as the arrangement of the connector contacts A, B, and C on the inside of the wall of the housing 3 is configured in such a manner that the central switch 2, with its contacts 20a, 20b, and 20c, not only forms an electrical connection with the connector contact A, B, or C that rests against one of its connector contacts 20a, 20b, 20c, in each instance, but also is able, at the same time, to activate the contact tappet 14, in each instance, counter to the force of a pressure spring 17, and move it into a closed position of the vacuum switching chamber 10, in each instance. With the help of the central switch 2, the power switch 1 and the disconnecting switch 4 can not only be brought into a line connection position with one another, to produce an electrical line connection to the bus bar 6, but also can be brought out of this line connection position, to produce a separation distance, whereby furthermore, both the disconnecting switch 4 and the power switch 1, separately or together, can be brought into a grounding position with the grounding switch 5.

Furthermore, the central switch 2 is locked and coupled with the drive of the power switch 1, particularly mechanically, in such a manner that the central switch 2 can only be moved if the power switch 1 is in its open position, in other words was triggered and opened.

The housing 3 is configured in arc shape in a wall region that extends over 180°, and has the disconnecting switch 4, the vacuum switch 5, and the power switch 1, flanged onto its outside, radially separated by 90° relative to the vacuum switch 5, in each instance, which switches project into the interior of the housing 3 with their connector contacts A, B, and C, with corresponding gaps. The housing 3 consists of an insulating material, particularly an electrically insulating cast resin. Thus, a switching system insulated with solid material can be formed with the housing 3.

In the switch positions in which no contact 20a, 20b, or 20c rests against a connector contact B and/or C, the pressure spring 17 holds the movable switching contact 15, in each instance, in the "open" position, and thereby secures the separation distance formed in the vacuum switching chamber 10, in each instance, whereby the vacuum chambers 10 specifically do not possess any independent shut-off capacity, but rather only secure the separation distance. The contact surface between the switching contacts 13 and 15 can be configured as a ring contact or a surface contact.

In total, the medium-voltage switching system insulated with solid material is characterized by its compact construction. All of the switching procedures are carried out within vacuum chambers, so that only minimal separation distances are necessary.

Of course, the electrical switching system can also be configured as a gas-insulated switching system, and the switching unit can be disposed in a housing filled with electrically insulating gas or also air or $N_2$ or $SF_6$.

Also, electrical switching systems can also be equipped with a central switch 2 on which a load switch is disposed in place of a power switch, particularly flanged on.

Accordingly, while only a few embodiments of the present invention have been shown and described, it is obvious that many changes and modifications may be made thereunto without departing from the spirit and scope of the invention.

What is claimed is:

1. A switch gear device, comprising:
   a housing;
   a power switch or load switch disposed at the housing, said power switch or load switch having a connector contact that projects into an interior of the housing;
   a disconnecting switch configured as a vacuum switching chamber and disposed at the housing, said disconnecting switch having a movable connector contact that projects into the interior of the housing;
   a grounding switch configured as a vacuum switching chamber and disposed at the housing, said grounding switch having a movable connector contact that projects into the interior of the housing; and
   a central switch disposed in the housing, said central switch adapted to mechanically actuate and move said movable connector contact of said disconnecting switch and said movable connector contact of said grounding switch; and produce electrical connections between the connector contacts of the power switch or load switch, disconnecting switch, and grounding switch.

2. The switch gear device according to claim 1, wherein said central switch is adapted to mechanically activate a contact tappet of each vacuum switching chamber and produce an electrical connection with each connector contact.

3. The switch gear device according to claim 1, wherein the central switch is coupled or locked together with a drive of the power switch or load switch, so that said central switch can be moved or activated only when the power switch or load switch is open.

4. The switch gear device according to claim 1, wherein the central switch is configured as a rotary switch.

5. The switch gear device according to claim 1, wherein the arrangement of the connector contacts and a shape of the central switch allow five switching positions:
- a normal position, in which the disconnecting switch and power switch or load switch are connected with one another;
- a second position, in which the disconnecting switch and the grounding switch are connected with one another, and the disconnecting switch as well as a bus bar are grounded;
- a third position, in which the power switch or load switch, disconnecting switch and ground switch are connected with one another, and the power switch or load switch and the disconnecting switch as well as the bus bar are grounded;
- a fourth position, in which the power switch or load switch and grounding switch are connected with one another, and the power switch or load switch is grounded; and
- a neutral position, in which no connection exists between the power switch or load switch, disconnecting switch, and grounding switch, and both the disconnecting switch and the grounding switch are open.

6. The switch gear device according to claim 1, wherein the vacuum switching chambers of the grounding switch and disconnecting switch have the same construction.

7. The switch gear device according to claim 5, wherein the central switch controls a separation distance of the vacuum switching chambers relative to the bus bar and relative to the grounding point.

8. The switch gear device according to claim 1, wherein the vacuum switching chambers have switching contacts configured as ring or surface contacts.

9. The switch gear device according to claim 1, wherein the vacuum switching chambers do not have an independent shut-off capacity, and further comprising means for maintaining their separation distance.

10. The switch gear device according to claim 1, wherein at least one of the vacuum switching chambers has a contact tappet guided in a folded bellows cuff, said contact tappet being stabilized in an open state of the vacuum switching chamber by means of a pressure spring disposed outside of the vacuum switching chamber and acting on the contact tappet or held in its open position.

11. The switch gear device according to claim 1, wherein the housing comprises an insulating material.

12. The switch gear device according to claim 1, wherein the housing with the central switch and the power switch or load switch connected to it, the disconnecting switch and the grounding switch form a switching unit.

13. The switch gear device according to claim 12, wherein the switching unit is disposed in a second housing filled with insulating gas.

14. The switch gear device according to claim 1, wherein the switching system is an integral part of a switching station or a switching cell.

\* \* \* \* \*